C. E. SMITH.
TYPE WRITING MACHINE.
APPLICATION FILED FEB. 17, 1909.

1,052,099.

Patented Feb. 4, 1913.
6 SHEETS—SHEET 5.

FIG. 9.

WITNESSES:
E. M. Wells
M. F. Hannweber INVENTOR:
Charles E. Smith
By Jacob Felbel
HIS ATTORNEY

C. E. SMITH.
TYPE WRITING MACHINE.
APPLICATION FILED FEB. 17, 1909.

1,052,099.

Patented Feb. 4, 1913.
6 SHEETS—SHEET 6.

WITNESSES:
P. M. Wells
M. F. Hanweber

INVENTOR:
Charles E. Smith
By Jacob Felbel
HIS ATTORNEY

UNITED STATES PATENT OFFICE.

CHARLES E. SMITH, OF NEW YORK, N. Y., ASSIGNOR TO UNION TYPEWRITER COMPANY, OF JERSEY CITY, NEW JERSEY, A CORPORATION OF NEW JERSEY.

TYPE-WRITING MACHINE.

1,052,099.   Specification of Letters Patent.   Patented Feb. 4, 1913.

Application filed February 17, 1909. Serial No. 478,472.

*To all whom it may concern:*

Be it known that I, CHARLES E. SMITH, a citizen of the United States, and resident of the borough of Brooklyn, city of New York, in the county of Kings and State of New York, have invented certain new and useful Improvements in Type-Writing Machines, of which the following is a specification.

My invention relates to typewriting machines and more particularly to billing mechanism for such machines.

One of the main objects of my invention is to provide simple and efficient billing mechanism for arresting the platen at predetermined points in its rotation and in which the mind of the operator is relieved from all strain incident to remembering certain indices; in watching indicating means during the operation of the devices; and in operating the mechanism accordingly.

A further object of my invention is to provide automatically actuated means operable at predetermined points in the rotation of the platen for rendering normally operative platen arresting means inoperative.

A still further object of my invention is to provide means whereby said automatically actuated means are operative during the rotation of the platen in one direction and are inoperative during the rotation of the platen in the opposite direction.

To the above and other ends which will hereinafter appear, my invention consists in the features of construction, arrangements of parts and combinations of devices to be hereinafter described and particularly pointed out in the appended claims.

In the accompanying drawings wherein like reference characters indicate corresponding parts in the various views.

My invention relates more particularly to billing devices of that character which arrests the platen after it has received a predetermined extent of rotation and in which the platen is turned backwardly and forwardly to receive newly introduced invoice sheets and to bring them forward in proper position to receive the first line of writing and at the same time maintain the invoice sheets properly positioned with reference to the record sheet as in "condensed record" billing work, although the devices of my invention may be employed in other kinds of billing work.

I have shown my invention embodied in a Monarch machine to which the novel devices of my invention may be readily applied without modifying, or materially modifying, the structural features of said machine, though it should be understood that the invention may be embodied in other styles of typewriting machines.

Figure 1:
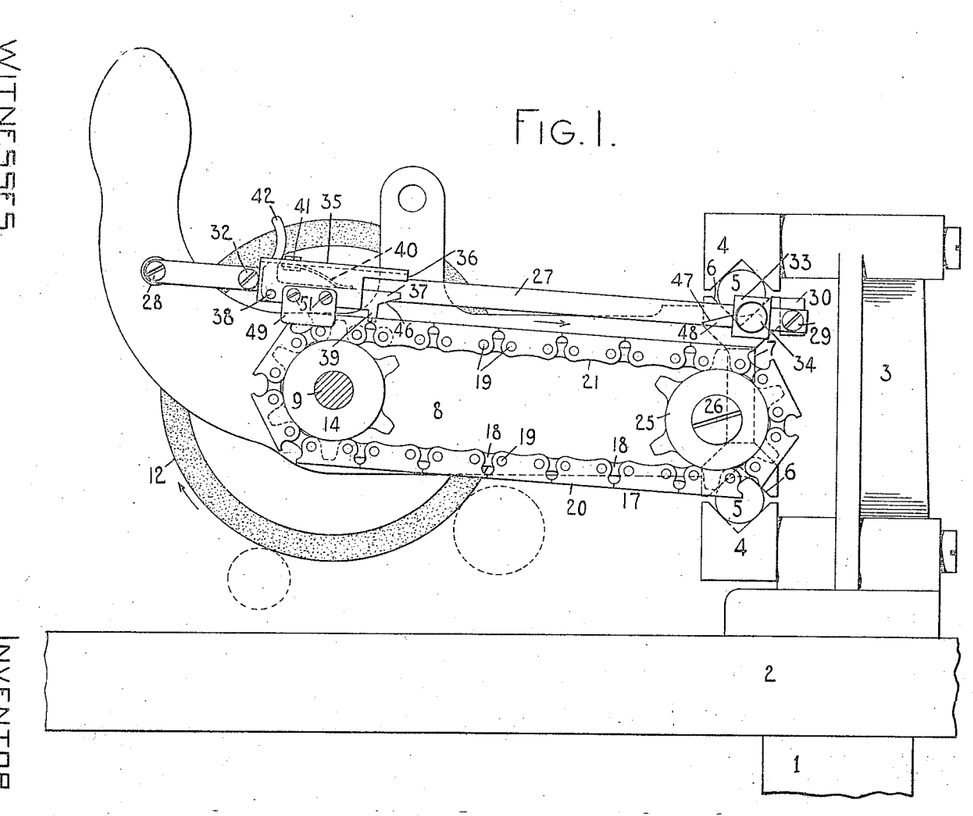
Figure 1 is an enlarged side elevation showing a portion of a Monarch machine equipped with one form of billing mechanism embodying my invention.
Figure 2:
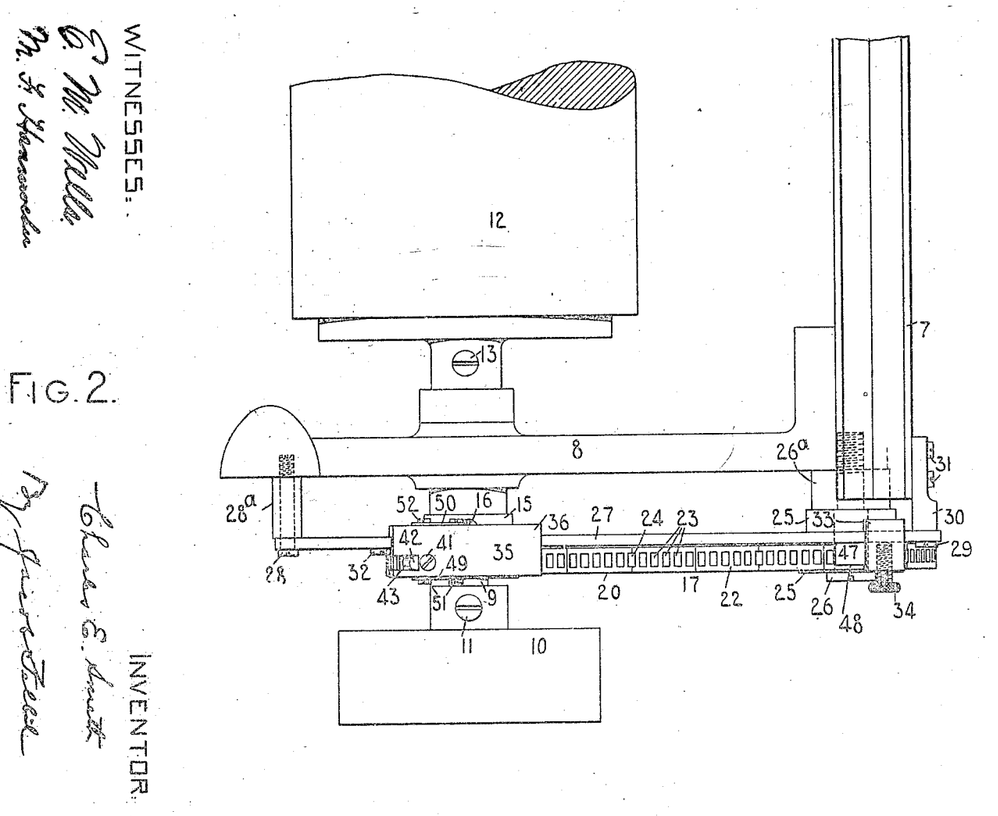
Fig. 2 is an enlarged fragmentary plan view of the same.
Figure 3:
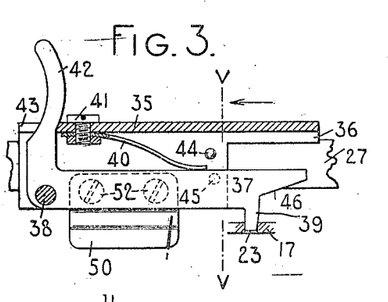
Fig. 3 is an enlarged detail sectional view of the traveling stop, its carrier and the means for connecting the two, the section being taken on the line $u$—$u$ in Fig. 4 and looking in the direction of the arrow at said line.
Figure 4:
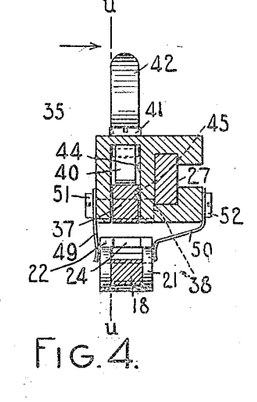
Fig. 4 is an enlarged detail transverse sectional view of the same, the section being taken on a line $v$—$v$ of Fig. 3 and looking in the direction of the arrow at said line.
Figure 5:
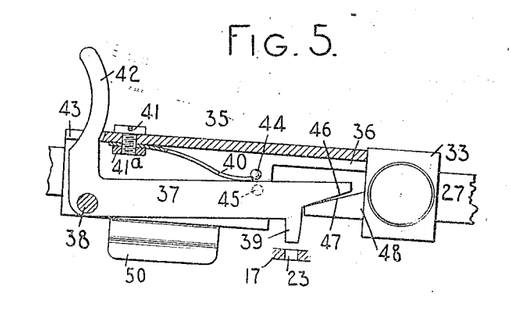
Figs. 5 and 6 are views corresponding to Fig. 3 except that the connecting device or latch is shown disconnected from the carrier in the former.
Figure 6:
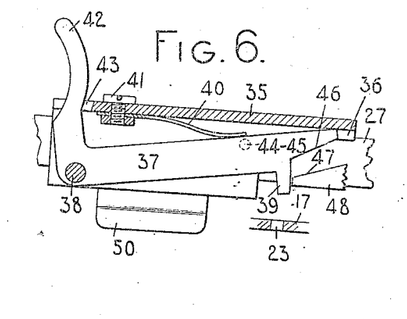
Figure 7:
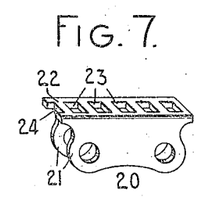
Fig. 7 is an enlarged detail perspective view of one of the links of the traveling chain, band or carrier.

Referring first more particularly to Figs. 1 to 7 of the drawings it will be seen that the corner posts 1 support a top plate 2 on which upwardly projecting risers 3 are fixed. These risers support oppositely grooved fixed guide rails 4 which receive anti-friction rollers or balls 5 that are likewise received in oppositely grooved faces 6 of a transverse carriage bar 7 which, together with the forwardly projecting end bars 8 at its ends thereof constitute a platen frame or carriage adapted to travel from side to side of the machine on the anti-friction balls or rollers 5. A platen shaft 9 extends through bearing openings in the end bars or plates and is provided at its ends with finger wheels 10 secured thereto by set screws 11. The platen shaft has a rotative platen 12 secured thereto by set screws 13. A sprocket, band or driving wheel 14 has its hub 15 (see Fig. 2) secured to the platen shaft by a set screw 16. This band wheel is preferably secured to the platen shaft, at the right-hand end portion thereof where it extends beyond the right-hand end plate 8 of the carriage so that it may be readily placed in position or removed from the shaft without disconnecting the platen from the carriage. The band wheel 14 coöperates with a stop carrier, endless band, flexible connection which in the specific form shown in Figs. 1 to 7 is in the nature of a chain 17 and which in practice I prefer to employ. This chain or flexible stop carrier may be formed of solid links 18 received between, and pivoted at 19 to, sheet metal links 20 each of which is preferably formed substantially U-shaped in cross section as shown in Figs. 4 and 7. The pivots which unite the solid links 18 and the sheet metal links 20 pass through the side members 21 of each sheet metal link which side members are united by a cross piece 22 perforated throughout its length as at 23 for the reception of the driving teeth on the sprocket wheel. The perforations may likewise be formed in one end of each of the sheet metal links as indicated at 24 in order that the openings 23 and 24 may be regularly spaced apart and brought as close together as possible without unduly weakening the links. The arrangement of the perforations in the links are best shown in Fig. 2. The endless band or chain 17 passes around the sprocket wheel 14 and around a corresponding sprocket or band wheel 25 mounted upon a shouldered headed pivot screw 26 which passes through the wheel and through a spacing washer or sleeve 26ª and is received at its threaded end in a tapped opening in the right-hand end bar 8 of the carriage. A bar 27 is secured at its forward end by a screw 28 to the right-hand end bar of the carriage, the screw passing through a spacing sleeve 28ª. The rear end of the bar 27 is secured by a screw 29 to a bracket 30, which in turn is secured to the rear side of the cross bar 7 by screws 31. A suitably fixed forward stop 32 is secured to the bar 27. This stop in the present instance may be a mere headed screw received in a tapped opening in the side of the bar. The rear end portion of the bar has mounted thereon a stop 33 which surrounds the bar and is adjustable along it. Any suitable means may be employed to secure the adjustable stop 33 in the position in which it is set along the bar. In the present instance I have provided a thumb screw 34 received in a tapped opening in the stop and adapted to bear at its inner end against the outer side of the bar to hold the stop in its adjusted position. A third stop 35 is mounted on the bar 27 to travel along it between the stops 32 and 33. The stop 35 is adapted to bear at one end against the stop 32 and at its opposite end has an extended portion 36 which is adapted to coöperate with the stop 33. The traveling stop 35 partly surrounds the supporting and guide bar 27, as is clearly shown in Fig. 4. Connecting means are provided for connecting the traveling stop 35 to the carrier, flexible band or chain 17. In the construction shown in Figs. 1 to 7 the connecting means comprises a catch, clutch, latch or locking device 37 pivoted between the sides of the stop 35 as indicated at 38. The latch 37 has a downwardly extending engaging member or nose 39 adapted to be received within the perforations 23—24 of the endless chain in order to positively connect the traveling stop to move with the chain. A leaf spring 40 is secured at one end by means of a screw 41 and nut 41ª to the stop 35, the free end of the spring bearing against the upper side of the pivoted catch 37 in order to force the locking nose or member into one of the perforations 23—24 of the endless chain, as indicated in Fig. 3 and thus normally maintain the stop 35 connected with the endless chain. The pivoted catch is provided with a finger piece or handle 42 which projects upwardly through a cut-out or opening 43 in the stop to a position where it may be readily grasped by the operator. A small projection or teat 44 projects inwardly from an inner wall of the stop 35 and is adapted to be received in a corresponding depression 45 in the latch in order to hold the latch in an elevated position where it is maintained out of engagement with the traveling band 17 and against the pressure of the spring 40 as shown in Fig. 6. The finger piece 42 enables the latch to be readily moved at will to the released position shown in Fig. 6 or to disengage it from its retaining means 44—45 when desired.

Projecting rearwardly from the free end of the latch is a cam 46 which is adapted to coöperate with a companion cam 47 formed on the upper side of a projection 48 which latter extends forwardly from the stop 33 as shown in Fig. 5. The position of the projection 48 and the cam 47 thereon is such that when the traveling stop 35 moves rearwardly with the band during the forward rotation of the platen, the cams 46 and 47 will be brought into coöperation just before the projection 36 on the traveling stop reaches the rear adjustable stop 33. The parts are so constructed and related that during the rearward movement of the stop 35 the cams 46 and 47 will coöperate to lift the latch 37 far enough to withdraw the engaging member 39 of the latch from the opening 23 or 24 in the band just prior to the engagement of the stop 35 with its coöperating stop 33, thus automatically disconnecting the traveling stop from its carrier or endless band or chain. The stop 35 has friction plates or devices 49 and 50 secured on opposite sides thereof by screws 51 and 52 respectively. These plates are preferably spring plates which are adapted to bear lightly against the opposite sides of the links 20 of the endless chain in order to provide a frictional connection between the traveling stop 35 and the chain. When the latch 37 has been automatically disengaged from the chain in the manner described the latch will be held disengaged and the traveling stop 35 will be held against the stop 33 as long as the forward rotation of the platen continues and until the platen receives a rearward rotation. The rearward rotation of the platen will cause the chain to move in an opposite direction from that which carried the latch into engagement with its releasing cam 47, and the frictional members 49 and 50 will cause the stop 35 to move with the chain. As the stop 35 starts to move away from the stop 33 the pressure of the spring 40 is effective to move the locking device down into one of the openings 23 or 24 in the chain when the stop has moved a slight distance from the stop 33, thus automatically reëstablishing a positive connection between the traveling stop and the endless chain. As the chain continues to move, the stop 35 now positively connected to the chain, will be moved with it until said traveling stop is arrested by contact with the forward fixed stop 32 when further movement of the stop 35 is prevented and the chain is locked against movement by reason of the positive connection with the traveling stop through the locking latch 37. Thus, it will be seen that as the platen is rotated forwardly the stop 35 will be moved from the point where it engages the stop 32 until the latch 37 is automatically disconnected through engagement with the releasing cam carried by the adjustable stop 33. The platen may then continue its forward rotation to any desired extent from this position independently of the stops. As soon, however, as a reverse or backward rotation is given to the platen, the chain will move in an opposite direction and carry the traveling stop 35 with it through the frictional devices 49 and 50 until the locking latch 37 reëngages the chain, thus positively connecting the traveling stop with its carrier. The backward rotation of the platen may then continue until the traveling stop has been moved to a point where it engages the stop 32. The stop 35, the chain to which it is positively connected and the platen which is positively geared to the chain, will then be arrested. While I have shown the releasing device 48 as a part of the adjustable stop it should be understood that it may be made a separate member if desired though I prefer to make it a part of the adjustable stop in order that the two may be adjusted together.

It will be understood that the purpose of the devices 44 and 45 and the finger piece 42 is for maintaining the latch or locking member 37 elevated in a position where it will not coöperate with the cam 47 and will be permanently maintained out of locking engagement with the endless chain. This is to throw the stop devices out of operation or to render them ineffective to arrest the platen when it is desired to use the machine for ordinary writing and to dispense with the use of the billing devices.

In the operation of the devices the platen is turned rearwardly until the stop 35 engages the stop 32. The invoice, condensed record sheet and interposed carbon sheet are introduced into the machine and the platen turned forwardly until the invoice sheet is in position to receive the first line of writing. This position will be readily observed by the operator in the usual manner. During this forward movement of the platen the traveling stop 35 moves in a rectilinear path along the bar 27 and away from the stop 32. After the invoice sheet is in position to receive the first line of writing the adjustable stop 33 is moved along the bar 27 until it engages the traveling stop and effects a disengagement of the latch 37 to disconnect the traveling stop from its carrier. The thumb screw 34 is then turned to secure the adjustable stop in place on the bar 27 and the billing devices are thus set and ready for use. The operator may then proceed with the writing on the invoice sheet which will be reproduced through the interposed carbon on the record sheet. After the bill is completed the operator will line space, say, twice in order to provide a proper space between the last written line of the copy on the record sheet and the first line of the copy of the next invoice to be written thereon. The operator may then withdraw the written invoice sheet without disturbing the record and carbon sheets. The platen may then be given a reverse or backward rotation which will be effective to move the traveling stop 35 out of engagement with its disconnecting device and cause the latch or locking device 37 to positively engage the chain and to move along the rod 27 until it is arrested by the forward stop 32. This is effective to arrest the platen, thus giving the predetermined extent of reverse rotation necessary to take up a new invoice or bill sheet which is then introduced and the platen is turned forwardly until the invoice sheet reaches a position to receive the first line of writing. This is observed by the operator in the customary manner and can be readily determined by the operator without resorting to the aid of billing devices, especially in "visible" writing machines. The proper position to cease rotating the platen is, however, indicated to the operator by the movement of the stop 35 into engagement with the adjustable stop 33. The operator may if desired rely on this means and should cease rotating the platen when the traveling stop reëngages the adjustable stop 33. This determines the extent of forward rotation necessary to bring the newly introduced invoice sheet to a position where the first line of writing may be produced. The bill or invoice is then written as before and so on the various bills may be written and copied until the record sheet is filled, when a new record, carbon and bill sheet may be introduced as previously described except that there is no necessity of changing the adjustment of the stop 33 until bill heads having different sized printed headings are employed.

By providing an endless carrier I am enabled when desired to so construct or arrange the devices as to afford more than a full revolution of the platen by arranging the band wheels 14 and 25 farther apart or altering the character of the band wheels and chain. However, in the present instance I have shown a construction which provides for slightly less than a full revolution of the platen and in most characters of work this will be found sufficient.

The parts are so proportioned and arranged that each line spacing position of the platen brings one of the notches beneath the engaging member 39 of the latch at the instant the latch is released from its disengaging device 48 so that as the traveling stop 35 is moved forwardly during the backward rotation of the platen it will always be engaged with the band at the same point in the travel of the stop.

Figure 8:
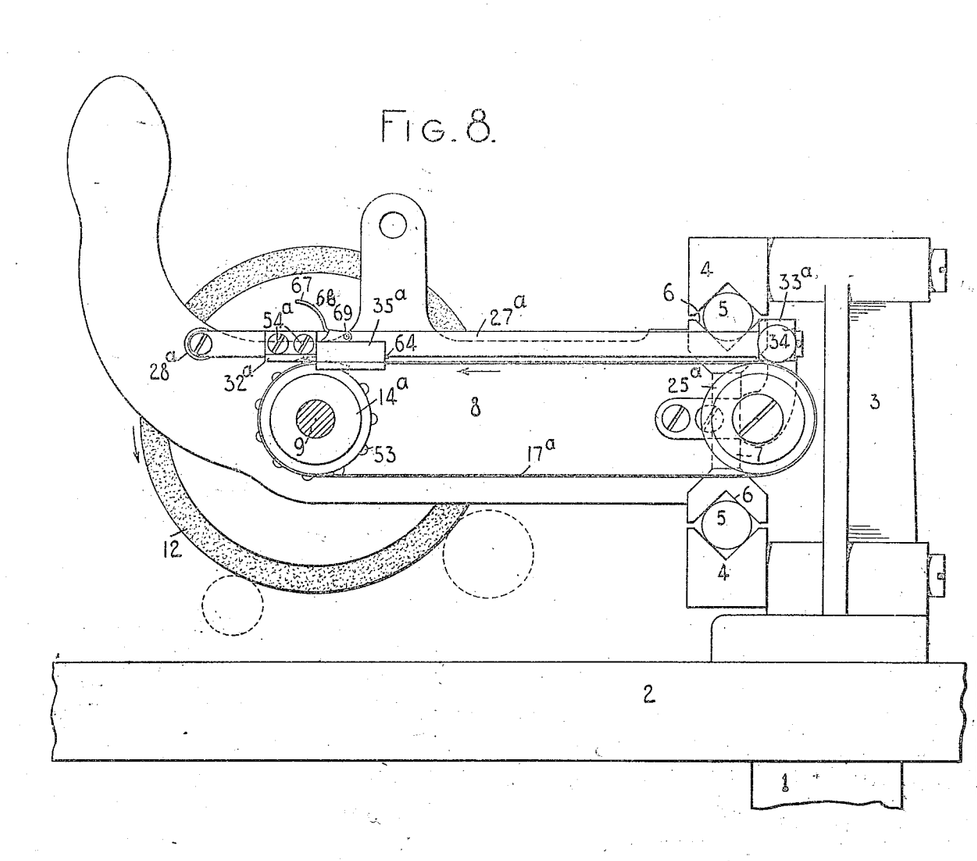
Fig. 8 is a view corresponding to Fig. 1 but showing another form of construction embodying my invention.
Figure 9:
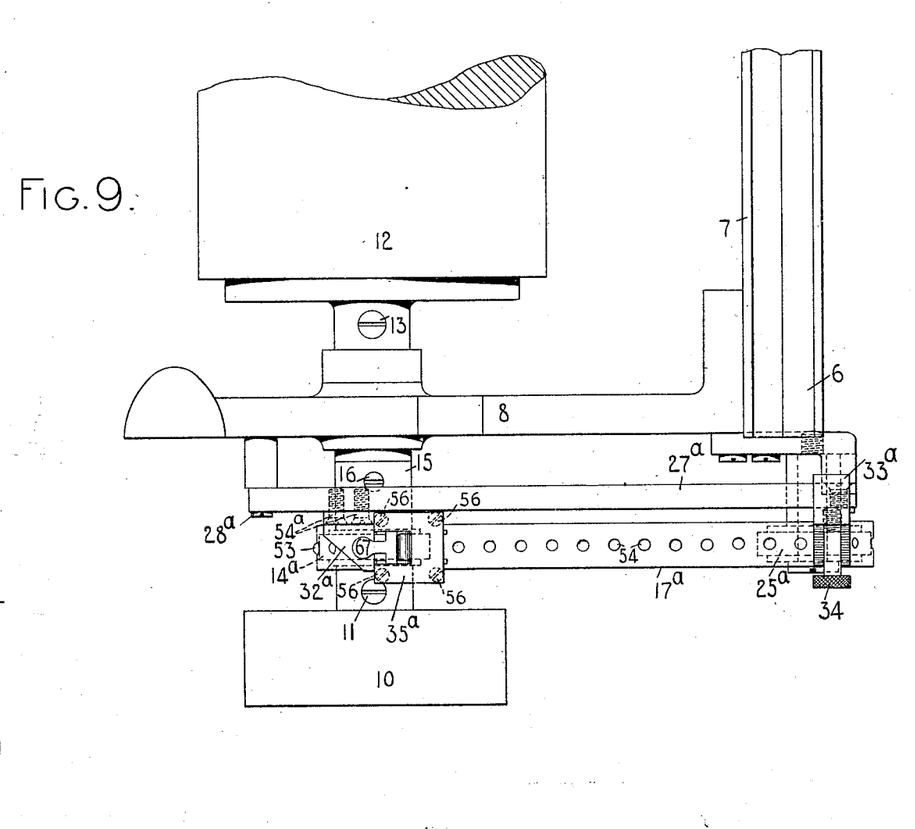
Fig. 9 is a view corresponding to Fig. 2 but illustrating the construction shown in Fig. 8.

It should be understood that various means may be employed for automatically effecting a connection and disconnection between the traveling stop and its carrier and that various forms of endless bands or carriers may be employed. In the construction shown in Figs. 8 to 13 inclusive I have shown a flexible metal band $17^a$ which surrounds the band wheels $14^a$ and $25^a$. The band wheel $14^a$ is secured to the platen shaft 9 as in the previously described construction and is provided with projections 53 which are adapted to extend into openings 54 in the band to positively connect the band to the platen. It is immaterial whether the band wheel $25^a$ is provided with such projections or not, inasmuch as this last mentioned band wheel is a mere idler. The adjustable stop $33^a$ is constructed and arranged like the previously described adjustable stop except that it is not provided with the disengaging cam or projection 48; but has a plain or flat engaging face and extends outwardly from the supporting bar $27^a$ and over the band $17^a$ into the path of the traveling stop. The forward fixed stop $32^a$ is in the nature of an angular bracket secured to the outer face of the bar by screws $54^a$, the outwardly extending projection of which forms the stop proper that extends into the path of the traveling stop. The traveling stop itself is cut out to receive the band $17^a$ and retaining plates 55 are detachably secured to the body portion of the traveling stop $35^a$ by screws 56. From an inspection of Fig. 11 it will be seen that these plates extend beneath the band so that the band is partly surrounded by the stop and the plates 55 secured thereto. There is an open space between the inner edges of the plates 55 through which the projections 53 on the forward band wheel may pass and in which the forward wheel itself may be received when the stop $35^a$ is in the position shown in Fig. 8. A cut-out 57 is likewise provided in the forward end portion of the traveling stop $35^a$ for the passage of the projections 53. Two parallel pockets or channels 58 are formed in the body portion of the movable stop for the reception of ball clutches 59 and 60, four being shown in the present instance, two balls 59 being situated at one end of the stop and two others 60 at the other end. The pair of ball clutches 59 each co-acts with an inclined wall 61 so that as the band moves in the direction of the arrow in Fig. 10 the ball clutches 59 will be jammed between the band and the walls 61 and carry the traveling stop with it. Each of the ball clutches 60 co-acts with an inclined wall 62 inclined in an opposite direction from the walls 61 so that when the band 17ª moves in a direction opposite to that indicated by the arrow in Fig. 10 the ball clutches 60 will engage the wall 62 and the band and connect the traveling stop to move with the band. A coiled expansion spring 63 is contained in each channel 58 and bears at one end against a ball clutch 59 and at its opposite end against a ball clutch 60, tending to force the balls away from each other and into engagement with their respective inclined engaging walls and with the band. It will be understood that the movement of the band in the direction of the arrow in Fig. 10 automatically tends to disengage the ball clutches 60 and jams and engages the ball clutches 59, whereas when the band moves in the opposite direction it jams the ball clutches 60 and tends to disengage the ball clutches 59. It will be seen that the clutches engage upon opposite sides of the driving openings 54 in the band so that there is no side or lateral strain upon the parts and there is no tendency of the traveling stop to bind unduly upon the band by reason of any such lateral strain. A pin 64 projects from the rear face of the traveling stop 35ª and slides in an opening in the body of the stop and bears at its inner end against the companion ball clutch 59, one of these pins being provided for each clutch. Each pin is normally maintained projected by the pressure of the spring 63 of the companion ball clutch 59. As the band moves in the direction of the arrow in Fig. 10, during the forward rotation of the platen, the band carries the traveling stop 35ª with it until the projecting ends of the pin 64 engage the face of the adjustable stop 33ª. This results in holding the ball clutches 59 while there is a tendency of the traveling stop 35ª to continue to move with the band until its right-hand contact face 65 is brought into engagement with the adjustable stop. This relative movement between the traveling stop 35ª and the ball clutches 59 displaces the ball clutches from their clutching engagement against the pressure of the springs 63, thus releasing the traveling stop from engagement with the band and the band may at this time continue to travel in the direction of the arrow independently of the stop 35ª.

It should be understood that there is sufficient friction between the traveling stop and the band, produced in part by the ball clutches 60, to overcome the slight resistance to the movement of the stop by the springs 63, thus assuring a disengagement of the clutches when the pins 64 contact with the adjustable stop 33ª. The relative movement between the band 17ª and the traveling stop 35ª tends merely to move the ball clutches 60 to the disengaging position so that they are ineffective to connect the traveling stop and band. As soon as the band starts to move in the opposite direction from that indicated by the arrow in Fig. 10 there is sufficient frictional contact between the traveling stop and band to carry the stop along with it until the body of the traveling stop has been moved to bring the engaging walls 61 into clutching engagement with the ball clutches 59, thus securely clutching the movable stop with the band. During a continued backward rotation of the platen the traveling stop continues to move with the band in the direction of the arrow in Fig. 8 until the forward engaging end 66 of the traveling stop contacts with the forward stop 32ª. The traveling stop being prevented from moving forwardly farther, the band 17ª will jam the ball clutches 60 between the band and their coöperative engaging wheels 62, thus locking the band against further movement in the direction mentioned and the platen, which is positively geared with the band, is also arrested. It will thus be seen that the ball clutches 59 coöperate with the band to lock the traveling stop to the band during the forward rotation of the platen until the pins or releasing means 64 are brought into engagement with the adjustable stop when the ball clutches 59 are automatically released and the band may continue its movement while the traveling stop is arrested by the stop 33ª, thus affording a continued movement of the platen independently of the stops to any desired extent. When the platen receives a reverse or backward rotation the clutch members 60 become operative to connect the traveling stop with the band and to lock the band and platen against movement when the traveling stop engages the forward fixed stop 32ª.

Figures 10, 11, 12, 13, 14, 15, 16, 17, 18, 19:
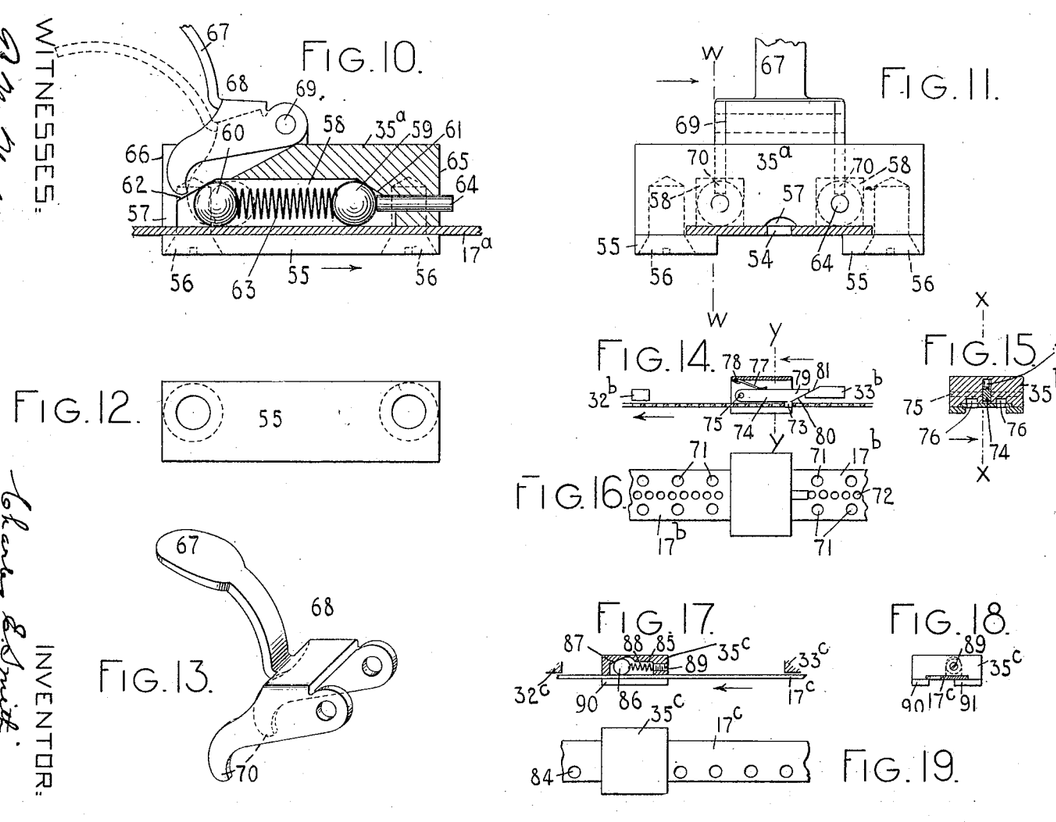
Fig. 10 is a detail sectional view of the traveling stop, band and connecting device shown in Figs. 8 and 9, the section being taken on a line $w$—$w$ of Fig. 11 and looking in the direction of the arrow at said line.
Fig. 11 is an end view of the same with the band shown in section.
Fig. 12 is an enlarged detail top plan view of one of the retaining plates of the traveling stop shown in Figs. 10 and 11.
Fig. 13 is an enlarged detail perspective view of the retaining latch or device for permanently throwing the billing devices out of use.
Fig. 14 is a sectional view of still another form of traveling stop, band and connecting device, the section being taken on the line $x$—$x$ of Fig. 15 and looking in the direction of the arrow at said line.
Fig. 15 is a transverse sectional view of the same, the section being taken on the line $y$—$y$ of Fig. 14 and looking in the direction of the arrow at said line.
Fig. 16 is a top plan view of the same.
Fig. 17 is a sectional view corresponding to Fig. 14 but showing still another form of traveling stop, band and connecting device.
Fig. 18 is an end view of the same with the band shown in section.
Fig. 19 is a plan view of the devices shown in Figs. 17 and 18.

If it is desired to throw the stop devices out of operation so that the platen may be moved backwardly and forwardly to any desired extent at all times it is merely necessary to depress the finger piece 67 to the dotted line position shown in Fig. 10. This is effective to turn a releasing device 68, shown in detail in Fig. 13, around its pivot 69 on the traveling stop 35. The depending hook-like members 70 of the releasing device 68 will, by this movement, be brought into engagement with the ball clutches 60 to force them against the tension of their springs 63 and out of coöperation with the inclined walls 62 so that at this time the ball clutches 60 are rendered and maintained ineffective. The device 68 is so constructed that there is sufficient friction between it and the body of the stop to maintain the ball clutches in their released position against the light pressure of their springs 63, although if desired any suitable means, such as the devices 44 and 45 previously described, may be employed to retain the releasing device against accidental displacement from its releasing position.

In Figs. 14, 15 and 16 I have illustrated still another form of traveling stop and means for connecting it with its carrier. In this construction the band 17ᵇ is provided with two series of perforations 71, one series near each edge of the band for coöperation with two sets of teeth on the coöperating driving wheel (not shown). A series of perforations 72 extend centrally of the band between the driving perforation 71 for coöperation with an engaging nose 73 on a latch 74 pivoted at 75 in a central opening or channel in a traveling stop 35ᵇ. Two parallel channels 76 extend through the stop in order to receive the projections on the coöperating driving wheel. A leaf spring 77 is connected at one end 78 to the traveling stop and at its opposite free end bears on top of the pivoted latch to force it down into locking engagement in the perforations 72 in the band. The locking latch is released in the same general manner as the construction shown in Figs. 1 to 7; thus the latch has an extension 79 with a cam 80 which coöperates with a cam face 81 on an adjustable stop 33ᵇ. The traveling stop also coöperates with a forward stop 32ᵇ. It is believed that the manner of operating the device and releasing the locking latch 74 in the present construction will be readily understood from the description of the devices previously referred to. In the construction shown in Figs. 14, 15 and 16 there is sufficient friction between the traveling band 17ᵇ and the traveling stop to move the stop with the band when the latter travels in the direction of the arrow in Fig. 14, so as to release the locking latch from the disengaging cam 81 and allow the latch to reëngage the band.

In the construction shown in Figs. 17, 18 and 19, I have shown a traveling band 17ᶜ provided with a series of driving perforations 84 near one edge of the band for coöperation with projections on a driving wheel similar to the driving wheel 14ᵃ but with the projections near one side of the wheel. The traveling stop 35ᶜ in the construction shown in Figs. 17, 18 and 19 has a channel or chamber 85 at one side thereof over the plane or imperforate portion of the band. A single ball clutch 86 is received in this channel and coöperates with an inclined wall 87 thereof. A coiled expansion spring 88 bears at one end against the ball and tends to force it into engagement with the band and the inclined wall 87 and at its other end bears against a set screw 89 received in a tapped opening in one end of the stop in order to adjust the pressure of the spring. Plates 90 and 91 are secured to the traveling stop and with the body portion thereof partly surround the band. The plate 91 extends beneath the ball clutch 86 in order to form a support for the band beneath the ball clutch. This construction is such that the traveling stop 35ᶜ is always positively connected to move with the band during the movement of the latter in the direction of the arrow in Fig. 17 and to arrest the backward rotation of the platen when the traveling stop reaches the forward fixed stop 32ᶜ, whereas when the band moves in an opposite direction the traveling stop will be only frictionally connected therewith and will be arrested when brought into coöperation with the stop 33ᶜ but the band may continue to travel at this time independently of the traveling stop, to afford any desired extent or forward rotation of the platen.

It should be understood that any suitable retaining means, such as those previously described, may be employed in connection with the clutches 74 or 86 to permanently maintain them in the released position when the billing devices are not to be used.

From the foregoing description it will be seen that in each of the constructions shown a flexible carrier or connection is provided which is positively connected with the platen to move concurrently therewith and with which a traveling stop is normally positively engaged; that associated means are provided for arresting the platen; that said stop and its associated arresting means are normally operative to positively arrest the platen; and that means are provided which are operative automatically at a predetermined point in the rotation of the platen for rendering the arresting means inoperative to arrest the platen.

Various changes may be made without departing from my invention.

What I claim as new and desire to secure by Letters Patent, is:—

1. In a typewriting machine, the combination of a rotative platen, fixed and movable stops for arresting the platen, a connecting device for normally positively connecting a movable stop to move concurrently with the rotative movement of the platen, and automatically actuated means operative at a predetermined point relative to the rotation of the platen for disengaging said connecting device and thereby disconnecting the movable stop controlled thereby from connection with the platen, said automatically actuated means including an adjustable device for predetermining the point in the rotation of the platen where such disconnection of the connecting device shall take place.

2. In a typewriting machine, the combination of a rotative platen, stops for arresting said platen, a flexible carrier for moving certain of said stops, and automatically actuated means for enabling the platen to rotate independently of said stops.

3. In a typewriting machine, the combination of a rotative platen, stops for arresting said platen, a flexible connection for moving certain of said stops, and automatically actuated means for enabling the flexible connection to move independently of such of the stops as are moved thereby.

4. In a typewriting machine, the combination of a rotative platen, stops for arresting said platen, a flexible connection for moving certain of said stops, and automatically actuated means for connecting such of said stops as are moved by said flexible connection to or for disconnecting the same from the flexible connection at a predetermined point relatively to the rotative movement of the platen.

5. In a typewriting machine, the combination of a rotative platen, a chain movable concurrently with the rotative movement of the platen, stops for arresting the platen, certain of said stops being moved by said chain, and automatically actuated means for disengaging from said chain such of the said stops as are moved thereby.

6. In a typewriting machine, the combination of a rotative platen, stops for arresting said platen, a flexible carrier for moving certain of said stops, automatically actuated means for enabling the platen to rotate independently of said stops, and adjustable means for determining at what point with reference to the rotation of the platen said automatically actuated means shall become effective.

7. In a typewriting machine, the combination of a rotative platen, stops for arresting said platen, a flexible connection for moving certain of said stops, automatically actuated means for enabling the flexible connection to move independently of such of said stops as are moved thereby, and adjustable means for determining at what point with reference to the rotation of the platen said automatically actuated means shall become effective.

8. In a typewriting machine, the combination of a rotative platen, a chain movable concurrently with the rotative movement of the platen, stops for arresting the platen, certain of said stops being moved by said chain, automatically actuated means for disengaging from said chain such of said stops as are moved thereby, and adjustable means for determining at what point with reference to the rotation of the platen said disconnection shall take place.

9. In a typewriting machine, the combination of a rotative platen, stops to aid in determining the extent of rotation that may be given said platen, means for effecting a relative adjustment between said stops, a flexible device for moving certain of said stops, and automatically actuated means for enabling the flexible device to move independently of said stops.

10. In a typewriting machine, the combination of a rotative platen, a platen frame, a chain, stops for arresting said platen, certain of said stops being held against movement on the platen frame and certain of them being moved by the chain, and automatically actuated means which enable the platen to be turned to any desired extent without being arrested by said stops.

11. In a typewriting machine, the combination of a rotative platen; means for positively arresting the rotative movement of the platen, said means including stops, and a stop carrier constantly connected to move concurrently with the platen, certain of said stops being normally positively and directly connected to move back and forth with the carrier; and automatically actuated means which are rendered effective during the forward rotation of the platen for rendering said stops inoperative to arrest the platen.

12. In a typewriting machine, the combination of a rotative platen, a stop, means coöperating with said stop to arrest the platen, a carrier for said stop, a normally engaged clutch for positively connecting said stop and carrier to move together during the rotative movements of the platen in both directions, and automatically actuated means for releasing said clutch at a predetermined point relative to the rotation of the platen.

13. In a typewriting machine, the combination of a rotative platen, stops for arresting the rotative movement of said platen, certain of said stops having a rectilinear movement, a stop carrier traveling concurrently with the platen and having a constantly maintained operative connection therewith, such of said stops as travel concurrently with the platen being carried by said carrier, and automatically actuated means for enabling the platen to turn independently of such of said stops as are carried by the stop carrier.

14. In a typewriting machine, the combination of a rotative platen, stops for arresting the rotative movement of said platen, certain of said stops having a rectilinear movement and traveling concurrently with the platen, automatically actuated means for enabling the platen to turn independently of said rectilinearly movable stop, and adjustable means for determining at what point in the rotative movement of the platen said automatically actuated means shall become effective.

15. In a typewriting machine, the combination of a rotative platen, an endless band which is adapted to move concurrently with the rotative movement of the platen, stop devices, and automatically actuated means for rendering said stop devices inoperative to arrest said band and platen during the rotation of the latter in one direction.

16. In a typewriting machine, the combination of a rotative platen, a pair of band wheels, a flexible band traveling about said wheels, a stop carried by said band, a bar for guiding said stop, a relatively fixed stop, and automatically actuated means for releasing the traveling stop from said band.

17. In a typewriting machine, the combination of a rotative platen, a band wheel connected to rotate therewith, a second band wheel, an endless band, a stop movable therewith, a relatively fixed stop on the frame, and automatically actuated means for releasing said movable stop from said band.

18. In a typewriting machine, the combination of a rotative platen, a movable stop therefor, a flexible band operatively connected to said platen for communicating motion to said stop, other means for arresting said movable stop, and automatically actuated means for disconnecting said movable stop from its moving means.

19. In a typewriting machine, the combination of a rotative platen, arresting means normally operative and normally connected to positively arrest the platen during its backward rotation, means operative automatically at a predetermined point in the forward rotation of the platen for rendering said arresting means inoperative to arrest the platen, adjustable means for determining at what point in the forward rotation of the platen said automatic means shall become effective, and means operable at will for rendering and maintaining said arresting means inoperative to arrest the platen.

20. In a typewriting machine, the combination of a rotative platen, a platen frame, a bar carried by and fixed to said platen frame, a stop which is carried by and slides along said bar, a coacting stop, and automatically actuated means for operatively connecting said sliding stop to and for disconnecting it from the platen, whereby rotation of the platen may cause the sliding stop to slide along said bar and whereby the platen may be rotated without transmitting movement to said sliding stop.

21. In a typewriting machine, the combination of a rotative platen, a movable stop that has a rectilinear movement, coöperating backward and forward stops positioned in the path of said movable stop, and automatically actuated means for normally maintaining a positive operative connection between the rectilinearly movable stop and the platen during the backward and forward rotative movements of the platen, and means coacting with the traveling stop during a predetermined time in its backward travel for disconnecting said stop from the platen so as to enable the platen to be rotated indefinitely independently of said movable stop.

22. In a typewriting machine, the combination of a rotative platen, a platen frame, a movable stop that has a rectilinear movement, coöperating relatively adjustable stops carried by the platen frame, and automatically actuated means for operatively connecting the movable stop to the platen to be moved concurrently therewith between said relatively adjustable stops and for disconnecting said movable stop from the platen to enable the platen to move independently of said movable stop, a relative adjustment of said relatively adjustable stops determining the point in the rotation of the platen where said automatically actuated means shall become operative.

23. In a typewriting machine, the combination of a rotative platen, coöperating stops to arrest the platen, certain of said stops having a rectilinear movement and certain of said stops being relatively adjustable, and automatically actuated means whereby the stops are rendered inoperative to arrest the platen and the platen is left free to be rotated indefinitely, a relative adjustment of said relatively adjustable stops determining the point in the rotation of the platen where said automatically actuated means shall become operative.

24. In a typewriting machine, the combination of a rotative platen, two wheels one of which is a driving wheel which turns with the platen, an endless band which passes around said wheels, a stop that is moved by said band, means coöperative with said stop to arrest the platen, and automatically actuated means for effecting an operative connection or disconnection between said stop and band.

25. In a typewriting machine, the combination of a rotative platen, wheels, one of which is a driving sprocket wheel which turns with the platen, a sprocket chain which passes around said wheels, a stop carried by said chain, means coöperative with said stop to arrest the platen, and automatically actuated means for connecting and disconnecting said stop and chain.

26. In a typewriting machine, the combination of a rotative platen, a flexible stop carrier, stopping means coöperative therewith to arrest the rotation of the platen, and automatically actuated means for rendering the previously mentioned parts inoperative to arrest the platen.

27. In a typewriting machine, the combination of a rotative platen, stops, one of said stops being normally positively connected to move concurrently with the rotative movement of the platen, automatically actuated means operative according to ad-